Figure 7:
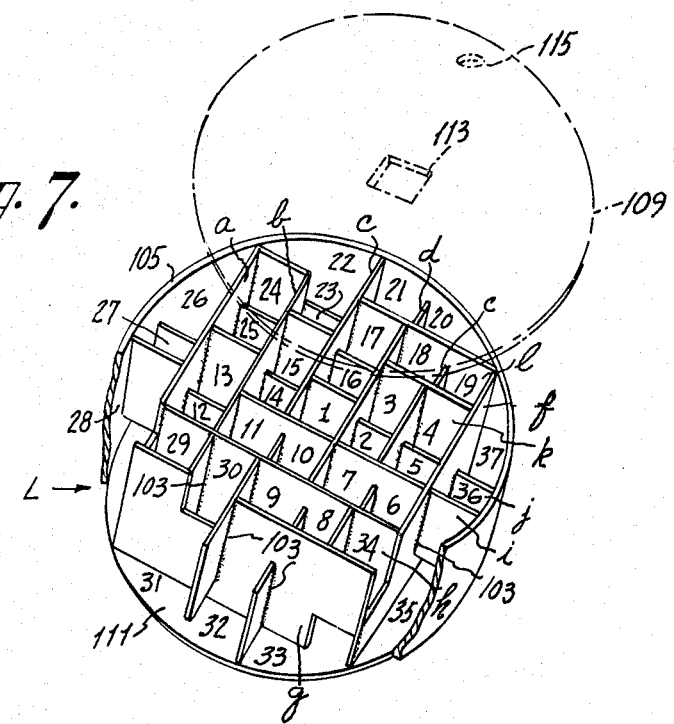

May 14, 1968     A. R. MORGAN     3,383,476
SOUND TRANSLATING APPARATUS
Filed March 17, 1965     3 Sheets-Sheet 1
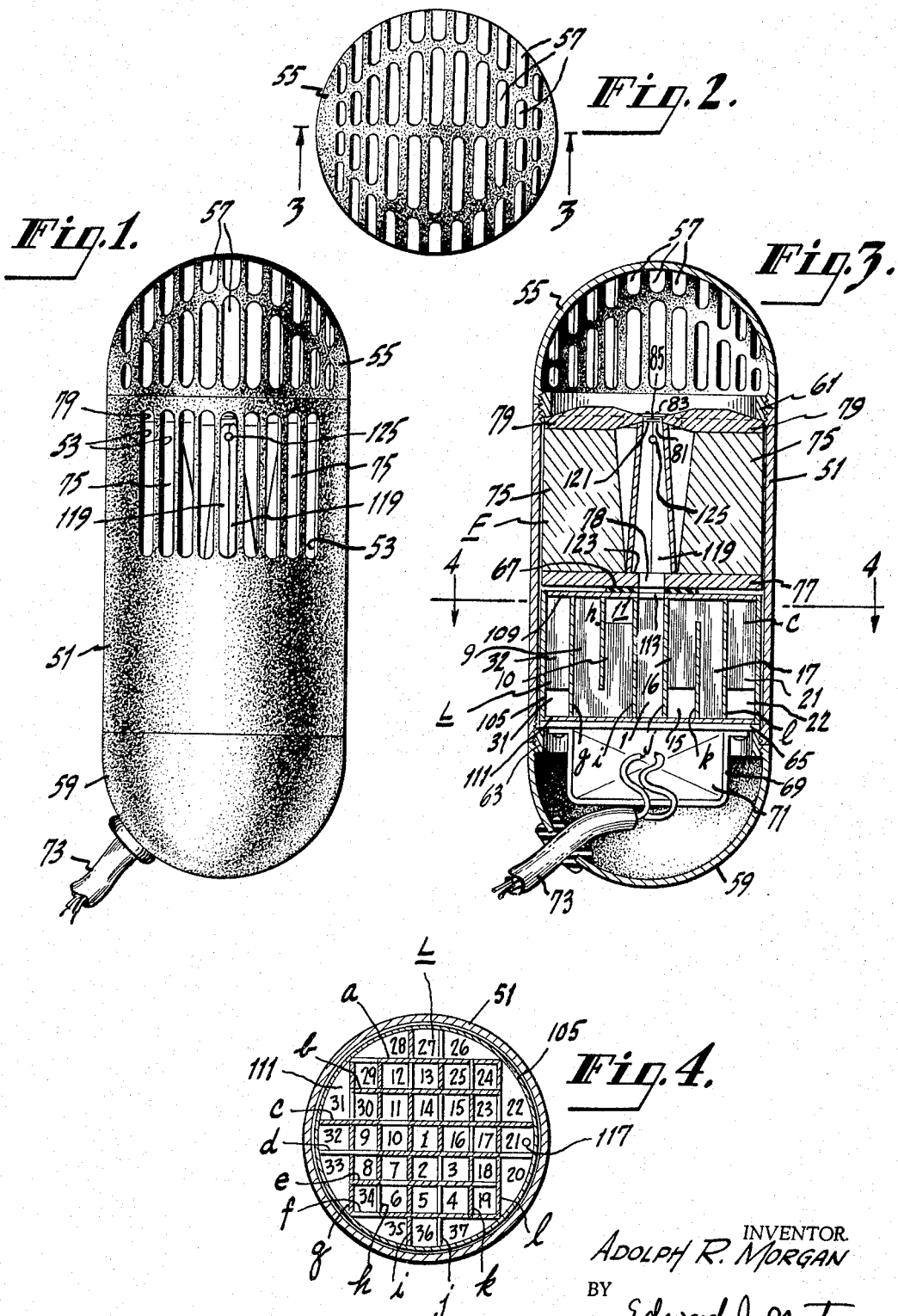
INVENTOR.
ADOLPH R. MORGAN
BY Edward J. Norton
Attorney

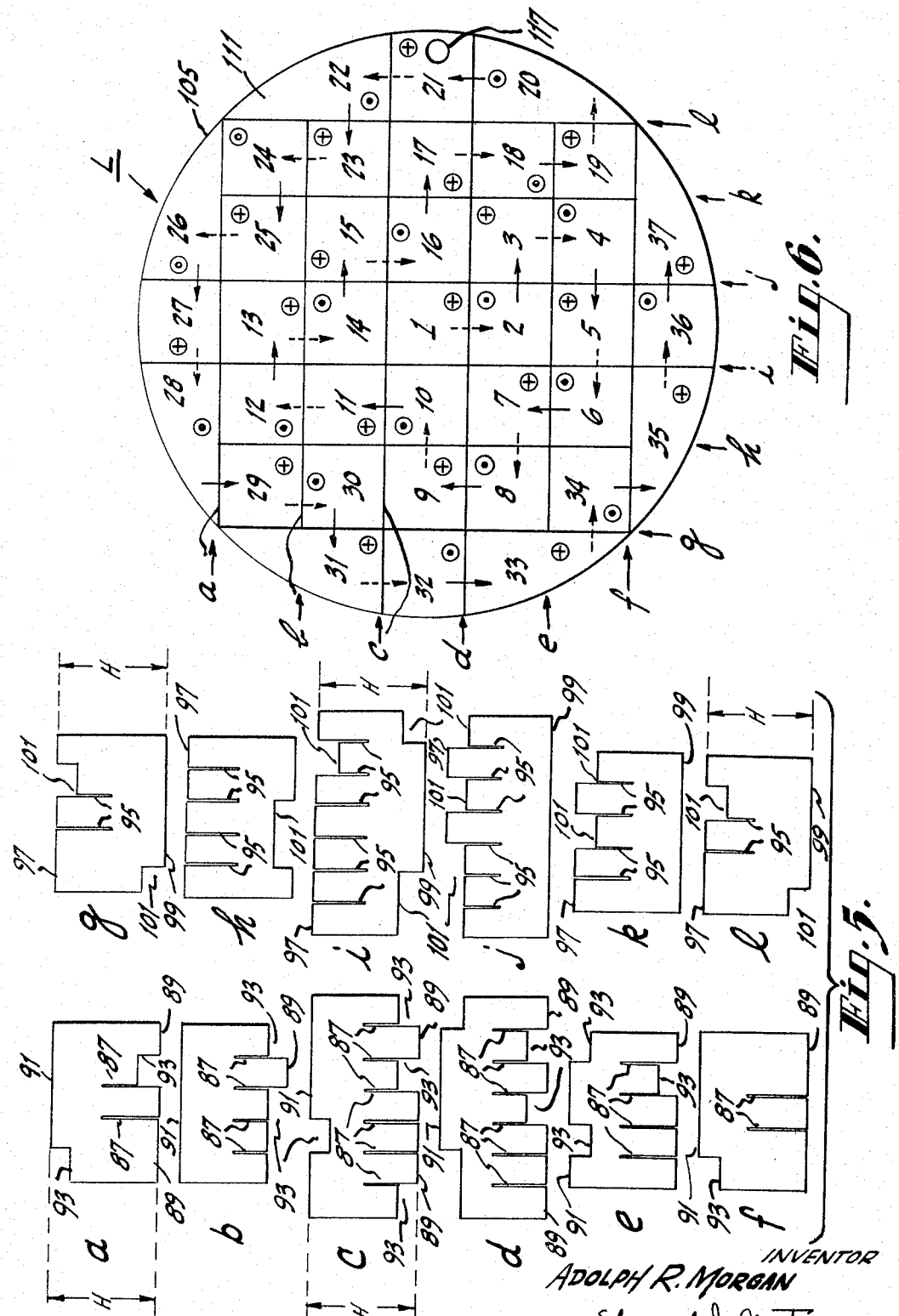

May 14, 1968   A. R. MORGAN   3,383,476
SOUND TRANSLATING APPARATUS

Filed March 17, 1965   3 Sheets-Sheet 3

INVENTOR.
ADOLPH R. MORGAN
BY Edward J. Norton
Attorney

3,383,476
SOUND TRANSLATING APPARATUS
Adolph R. Morgan, Princeton, N.J., assignor to Radio Corporation of America, a corporation of Delaware
Filed Mar. 17, 1965, Ser. No. 440,576
10 Claims. (Cl. 179—180)

This invention relates to sound translating apparatus, and particularly to a uni-directional microphone of the type employing a ribbon-like conductor mounted for movement in a magnetic field in response to sound waves impinging thereon against one side thereof, the other side of the conductor being terminated by a relatively long tube or pipe filled with suitable acoustic resistance material.

Theoretically, to properly terminate the vibratory conductor, a pipe of infinite length is required. In practice, however, since this is not possible, a long, finite pipe is used, the pipe being filled with acoustic damping material such as loosely packed hair felt, or Ozite, for example, to thereby simulate a loading pipe of infinite length. Now, if a long, straight pipe is employed, the microphone becomes large, bulky, unwieldly, and cumbersome to handle. To shorten the over-all size of the microphone while still retaining a terminating pipe of suitable length, it has been proposed to fold the pipe in the form of various labyrinth structures as shown, for example, in the patents to L. J. Anderson, 2,178,216, H. F. Olson, 2,271,988, and H. F. Olson et al. 2,870,856, that of the Olson patent 2,271,988 being the one most commonly used heretofore. The labryinth of the last mentioned Olson patent is made out of a solid, cylindrical block having a plurality of longitudinally extending, radially and circumferentially spaced bores therethrough which are serially connected to one another at their ends in a manner to provide a long, continuous passage or pipe. This labyrinth is filled with acoustic damping material as described above and is coupled at one end to the vibratory, conductive ribbon by a short length of pipe which extends from the labyrinth to immediately behind the ribbon and which is commonly known in the art as a labyrinth connector.

The form of labyrinth shown in the Olson et al. patent, 2,870,856, is also made from a solid, cylindrical block and is formed with longitudinal bores and radially outwardly extending, peripheral fins to provide a plurality of passages which are serially interconnected in a manner to form a relatively long passage or pipe in which the damping material is disposed. In the Anderson patent, 2,178,216, the labyrinth is made up of a plurality of superposed, tray-like members having spiral and helical passages therein which are serially connected to form the long pipe or passage in which the damping material is disposed. In all of these and other known labyrinth structures, considerable machining and/or molding of the parts are required, and great care must be exercised in assembling them. All this adds to the cost of manufacture of the microphone. Moreover, known labyrinths, usually made of metal, are relatively heavy, even when made of aluminum, and they require relatively large space both in the microphone case and for storage in stock.

The primary object of this invention is to provide, in a microphone of the type set forth, an improved labyrinth structure which is free of the aforementioned disadvantages.

More particularly, it is an object of this invention to provide an improved microphone of the type set forth which is smaller in size, lighter in weight, and more compact than microphones of the prior art.

Another object of this invention is to provide, in a microphone as aforesaid, an improved labyrinth structure which is of almost negligible weight, and which has a pipe length greater than those heretofore provided by prior art labyrinths in a given volume of space in the microphone case, or which, for a given pipe length, occupies less space so that the microphone can be made smaller in size.

Still another object of this invention is to provide, for microphones of the type described, a novel labyrinth structure which is comprised of a number of simple parts capable of being assembled readily even by unskilled workers, and which, when unassembled, occupy relatively small storage space.

A further object of the present invention is to provide an improved microphone as aforesaid which has high sensitivity, and which exhibits frequency response and directional characteristics that compare very favorably with high quality, similar microphones of the prior art, notwithstanding its lighter weight and smaller volume.

A still further object of this invention is to provide an improved microphone as above set forth which, while by no means limited thereto, is especially useful in sound recording for motion pictures.

It is also an object of this invention to provide an improved microphone as aforesaid which, including the novel labyrinth thereof, is relatively inexpensive in cost, easy to manufacture, and highly efficient in use.

In accordance with one form of the invention, the labyrinth is fabricated from a plurality of flat wall members or partitions of paper having a thickness of about 0.01 inch. Such paper is, of course, very light in weight and can be die cut easily to provide the partition forms about to be described. All of the partitions have the same over-all height, and they are arranged in two parallel groups orthogonally related to each other. The partitions of one group are formed with a series of two or more spaced, parallel slots which extend upwardly from the lower edges thereof at preselected locations to a medial line between the outermost, longitudinal edges thereof. The partitions of the other group are likewise formed with two or more similarly spaced, parallel slots which extend downwardly from the upper edges thereof at preselected locations to a similar medial line. Thus, the slots in the respective groups of partitions extend in opposite directions, and they are so located that the partitions of one group can interlock with those of the other at these slots to provide a cellular structure similar to that formed by the well known spacer used in cartons for separating bottles or the like from each other. The junctions of the interlocking partitions are treated with a suitable cement to prevent haphazard leakage between adjacent cells. The cells or individual passages thus formed by the interlocked partitions extend along the full height of the partitions. They are closed off at their ends by the top and bottom closure plates disposed against the assembled partitions.

To provide serial communication between adjacent ones of the cells and thus provide one long, continuous labyrinthian passage or pipe, the individual partitions are undercut at one or more preselected locations at either or both of the opposed, longitudinal edges thereof, thus reducing the effective height of each partition at places where communications between cells is desired. By undercutting the partitions at appropriate location along the opposed, longitudinal edges thereof, comunication is established between certain pairs of the cells at the top of the structure and between certain other pairs of the cells at the bottom of the structure. The undercut locations are so chosen that the second cell of a pair having communication with each other at one end of the labyrinth structure becomes the first of the next pair and has communication with the next succeeding cell at the other end of the labyrinth structure; and the last mentioned cell has communication with the one that follows it at the first mentioned end of the labyrinth structure, and so on through all of the cells beginning with a first one and continuing on through the last one. In this way, a long, continuous passage is provided through all of the serially communicating cells. The various cells are filled with suitable acoustical resistance material, such as Ozite, for example, before the closure plates are applied to the labyrinth partition structure.

The labyrinth structure described above is disposed in a microphone case which also encloses a pair of opposed magnets and associated pole pieces which are spaced from each other to provide an air gap. In this air gap is mounted a thin ribbon conductor for vibratory movement in response to sound waves striking the front face thereof. A labyrinth connector couples the labyrinth to the rear surface of the conductor. The magnets are preferably formed of Alnico V-7 which has a much higher energy product than magnets previously used. Hence, for a given flux density in the air gap, smaller magnets can be used when employing Alnico V-7, thereby further reducing the weight of the microphone. The labyrinth connector is preferably molded from suitable plastic material in two mirror image parts. The two parts, which are cemented together to form the labyrinth connector, can be made at much less expense by molding than are the machined connectors of the prior art, and they also have the advantage of being lighter in weight.

Figure 8:
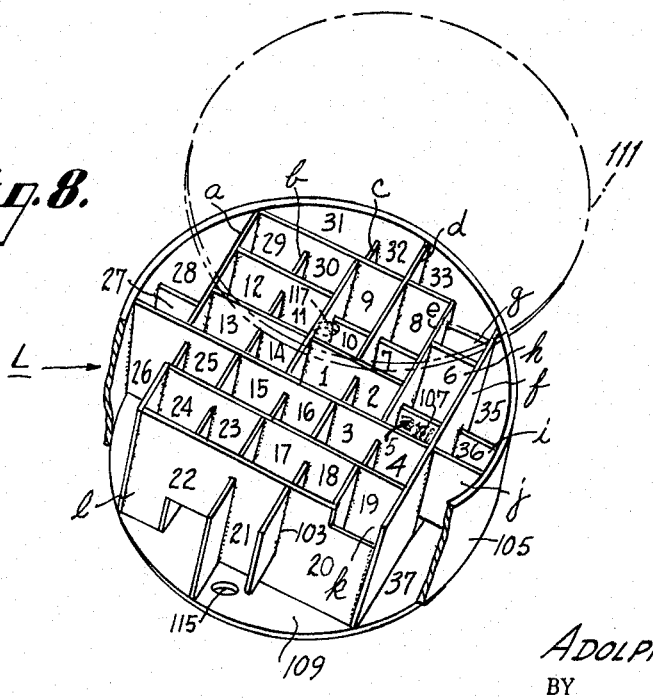

The novel features of the invention, both as to its organization and method of operation, as well as additional objects and advantages thereof, will be more readily apparent from the following description, when read in connection with the accompanying drawings, in which:

FIG. 1 is a side elevation of one form of microphone according to this invention, FIG. 2 is a top plan view thereof, FIG. 3 is a longitudinal, central sectional view taken on the line 3—3 of FIG. 2 and viewed in the direction of the appended arrows, FIG. 4 is a transverse sectional view taken on the line 4—4 of FIG. 3 and viewed in the direction of the appended arrows to show the assembled array of partitions forming the labyrinth structure of the present invention, FIG. 5 is a plan view of the various partition members in separated relation, those in the left column comprising one group of partitions, and those in the right column comprising the other group of partitions, FIG. 6 is an enlarged, diagrammatic view showing the arrangement of the partition members when they are assembled into labyrinth forming relation and showing, also, the path followed by sound wave energy through the labyrinth from cell to cell, FIG. 7 is a perspective view of the labyrinth structure as seen from the top, and FIG. 8 is a similar view of the labyrinth structure but in inverted relation to that shown in FIG. 7.

Referring more particularly to the drawings, there is shown a microphone having a casing formed of a preferably cylindrical shell 51 provided with a plurality of slots 53 therethrough, a front cover or dome 55 which has similar slots 57 therethrough, and a rear cover or end bell 59. The shell 51 and the dome 55 are joined together tightly by being threaded onto an externally threaded ring 61, and the shell 51 and the end bell 59 are similarly joined by being threaded onto an externally threaded ring 63. The shell 51, the dome 55, the end bell 59, and rings 61 and 63 are preferably all made of a light weight aluminum alloy such as Dural.

Clamped between the rings 61 and 63 are a magnetic field structure F a labyrinth structure L, and a plate or disc 65 on which the labyrinth structure L rests. A shim 67 of soft rubber maintains the field structure F and the labyrinth structure L in somewhat spaced relation and takes up the space therebetween to insure their being held in place firmly. The shim 67 also serves to provide a seal as hereinafter described. A bracket 69 secured to the plate 65, carries an output transformer 71 having a cable 73 for connection of the microphone output to an amplifier in known manner.

The field structure F includes a pair of opposed magnets 75 secured to a magnetic plate 77, and a pair of opposed, magnetic pole pieces 79 which are secured to the magnets and terminate in slightly spaced, aligned pole tips to provide an air gap 81 therebetween. Secured to the pole pieces 79 are a pair of non-magnetic clamping members 83 between which are clamped the respective ends of a thin, corrugated, ribbon conductor 85 disposed in the air 81 gap between the pole tips. The front surface of the ribbon 85 is open to the ambient through the slots 57 or the dome 55 so that sound waves originating in the ambient can reach the ribbon front surface and cause the ribbon to vibrate and generate sound representing signal voltages in conductive leads (not shown) connected to the ends of the ribbon, as is well known. The magnets 75 are preferably made of Alnico V-7, which has a much higher energy product than the Alnico V customarily used in prior art microphones. Hence, for a given air gap flux density, magnets of much smaller size than those used heretofore can be used, thereby attaining a considerable reduction in weight for the microphone. The plate 77 and the pole pieces 79 are preferably made of Permandur and the ribbon 85 of aluminum, while the ribbon supporting clamping members 83 can be made of brass, for example. However, any other suitable materials may be used for these parts.

The labyrinth structure L is made up, in part, of two groups of flat wall members or partitions $a \ldots l$, inclusive. These partitions are preferably made of paper stock which is about 0.010 inch thick and which may be suitably calendered to render it somewhat stiff but which, of course, is very light in weight and therefore serves to further reduce the weight of the microphone. The individual partition members may be die cut into the various, generally rectangular forms shown in plan view in FIG. 5. All of the partition members of both groups are of the same over-all height. However, the partition members $a$, $b$, $e$ and $f$ of the left hand group and the partition members $g$, $h$, $k$ and $l$ of the right hand group are all of the same length but are shorter than the partition members $c$ and $d$ of the left hand group and the partition members $i$ and $j$ of the right hand group, the partitions $c$, $d$, $i$ and $j$ all being of equal length.

The partitions $a$ to $f$, inclusive, are formed with two or more transverse slots 87 therein extending parallel to each other from the lower longitudinal edges 89 thereof at selected, spaced locations therealong. These slots 87 extend half way toward the respective, opposite, longitudinal edges 91 of the partitions $a$ to $f$. These partitions are also undercut at selected locations along their opposed edges 89 and 91 to provide undercut areas 93 for a purpose shortly to be set forth. Similarly, the partitions $g$ to $l$, inclusive, are formed with two or more correspondingly spaced, transverse slots 95 which extend in parallel relation from the upper longitudinal edges 97 thereof at preselected, spaced locations therealong half way toward their respective, opposite, longitudinal edges 99. The partitions $g$ to $l$ are also undercut at selected locations along their opposed edges 97 and 99 to provide undercut areas 101 for a purpose which will shortly become apparent.

The partitions a . . . l, inclusive, are assembled into a labyrinth forming array by arranging the partitions a to f, inclusive, of the first group in parallel relation to each other at a spacing equal to the spacing of the uniformly spaced slots 95 of the partitions i and j. Similarly, the partitions g to l, inclusive, of the second group are arranged parallel to each other at a spacing equal to the uniformly spaced slots 87 of the partitions c and d. However, the partitions of the second group are disposed in orthogonal relation to those of the first group. When so disposed, the various partitions will interfit with each other at the respective slots 87 and 95 to provide a plurality of individual cells 1 . . . 37, inclusive, as seen in FIGS. 4, 6, 7 and 8. The partitions are then all of the same over-all height and they can be interlocked in the described relation by applying to them, along the corners of the various cells, a thin layer of cement 103. The cement 103 serves also to seal the walls of the cells to prevent leakage between adjacent cells.

It will be noted that the cellular structure thus formed is generally similar in form to spacers used in cartons, crates, and the like for maintaining in separated relation such items as bottles, eggs, etc. However, in the present case, it is desirable to provide communication between the various cells so as to obtain a long, continuous passage or pipe beginning with a first one of the cells thus formed, and continuing on serially from one to the other of the cells through all of them until the end of the last one is reached. It is for this reason that the undercut areas 93 and 101 are provided. These undercut areas are at locations on the respective partitions such that certain pairs of adjacent ones of the cells communicate with each other at one (say, the upper) end of the array, while certain other pairs of adjacent ones of the cells communicate with each other at the opposite (say, the lower) end of the array. Furthermore, to make the passage continuous, every cell except the first one and the last one forms a pair with the cell immediately preceding it (considered in a direction going from the first cell to the last cell) and communicates with it at one end of the array; and it also forms a pair with the cell immediately following it in the same direction and communicates with the latter cell at the opposite end of the array. The first cell forms a pair only with the second cell, and the last cell forms a pair only with the one just ahead of it. In this way, the cells are connected serially to provide a continuous passage or pipe having a length equal to the sum of the lengths of all of the cells 1 to 37, inclusive.

It will also be noted that all of the cells numbered 1 to 19, inclusive, 23, 24, 25, 29, 30 and 34, which are enclosed within the partitions a, f, g and l, are closed on all sides, whereas the end cells 20, 21, 22, 26, 27, 28, 31, 32, 33, 35, 36 and 37, all of which are outside of these partitions, have one open side. To close the latter twelve cells at their open sides, there is provided a cylindrical sleeve 105 around the assembled partition array. The sleeve 105 may be formed of the same material as are the partitions a . . . l and can be cemented to them in the same manner as the partitions are to each other.

The cells 1 to 37, formed as above described, are all loosely filled with acoustical resistance material 107, such as Ozite (shown only in cell 5 in FIG. 8 by way of illustration). The cells are closed off at their ends by an upper closure plate 109 and at their lower ends by a lower closure plate 111. The plates 109 and 111 may also be made of the same material as the partitions a . . . l and cemented to the longitudinal edges 89, 91, and 97, 99 thereof by a suitable adhesive. The upper plate 109 has a central opening 113 which opens into the central cell 1 of the labyrinth array, and a second opening 115 near the periphery thereof. The lower plate 111 has an opening 117 near its periphery and in substantial alignment with the opening 115. The conductive leads (not shown) from the ends of the ribbon 85 are brought down through the openings 115 and 117 to the transformer 71. In order to avoid unnecessary confusion in the drawing, the slots 87, 95 have not been fully drawn in FIGS. 7 and 8. The positions of the slots 87, 95 are as shown in FIG. 5. The portion of each slot 87 or 95 not occupied by a partition is cemented together to provide a solid wall for each cell and to prevent leakage between the cells.

The rear surface of the ribbon conductor 85 is coupled to the labyrinth passage by a labyrinth connector 119 which may be of the type shown in the H. F. Olson et al. patent 2,680,787 and is secured to the plate 77. The connector 119 is made of non-magnetic material. In the interest of ease of manufacture, of lower cost and of light weight, it is preferably molded in two, opposed, mirror-image parts out of plastic material such as Araldite Epoxy Casting Resin, and the two parts are cemented together to provide a hollow connector which is also filled with acoustic resistance material (omitted in FIG. 3 to more clearly illustrate the connector). The connector 119 is so shaped that its end immediately behind the conductive ribbon 85 substantially closes off the air gap 81. At this end, the connector 119 is formed with an elongated, rectangular orifice 121 which is of substantially the same shape and area as the rear surface of the ribbon 85 and into which the vibrating ribbon 85 feeds acoustical energy to be dissipated by the labyrinth. From its end just behind the ribbon 85, the connector 119 gradually tapers outwardly in the plane represented by the line 3—3 of FIG. 2 (as best seen in FIG. 3) and tapers inwardly in a plane normal to that plane, the lower end of the connector (as viewed in FIG. 3) terminating in a substantially square shape and having a square opening 123 in alignment with the openings 78 and 113. The shim 67 provides a seal against leakage between the labyrinth connector 119 and the labyrinth structure L. As thus far described, the combined connector 119 and labyrinth L imparts to the microphone a non-directional characteristic, as is well known in the art. If it is desired to have the microphone exhibit an essentially unidirectional characteristic, the connector 119 is formed with aligned openings 125 in the opposed side walls thereof and just behind the orifice 121, as in the above-mentioned Olson et al. patent 2,680,787, and according to the teaching in the H. F. Olson patent, 2,301,638. The unidirectional microphone is especially useful in sound recording for motion pictures, but is not, of course, limited to only such use.

Sound waves generated by the rear surface of the ribbon pass into the orifice 121, through the labyrinth connector 119, and out through the opening 123 at its other end and through the openings 78 and 113 in the plates 77 and 109, respectively, to enter the central cell 1 of the labyrinth structure. The path of the sound wave energy through the labyrinth is illustrated in FIG. 6 where the solid arrows indicate passage of the sound waves over the top edge of one or another of the various partitions a . . . l at one of the cutaway areas 93 or 101, and the dotted arrows indicate passage of the waves under the lower edge of a cutaway area 93 or 101, as the case may be. Also, in each of the cells, the downward passage of the sound waves through a cell is indicated by a cross within a circle (representing the tail of an arrow) while the upward passage of the sound waves through a cell is indicated by a dot within a circle (representing the pointed head of an arrow). Using this guide, the path through the labyrinth of the sound waves entering the cell 1 can be traced as follows:

The sound waves pass down through the cell 1 and under the lower edge of the partition d at a cutaway area 93 and into the cell 2 where the waves pass upwardly. At the top of the cell 2, the waves pass over the upper edge of the partition j at a cutaway area 101 and then down through the cell 3. At the bottom of the cell 3, the sound waves pass under the lower edge of the partition e at a cutaway area 93 then up through the cell 4 and over the partition *j* again at another cutaway area 101 thereof, then down through the cell 5, and so on through all of the cells. Picking up the path of the sound waves in the next-to-last cell 36, it will be noted that they pass up through the cell 36 after having passed under the partition *i* at a cutaway portion 101 thereof, and from the cell 36 over the upper edge of the partition *j* at still another cutaway area 101 thereof and then down through the cell 37 which terminates the labyrinth. By this time, the sound waves are, for practical purposes, completely dissipated.

From the foregoing description, it will be apparent that the present invention provides a small, compact, light weight microphone having the advantages heretofore noted. Among other things, the labyrinth structure described herein is not only of negligible weight but because it can be made longer in a given volume of space, it more nearly approaches the ideal pipe of infinite length and, therefore, helps to increase the efficiency of the microphone. In unassembled, relation, the partitions *a . . . l* can be stacked flat for each partition form to occupy a minimum space in storage, and they can be assembled easily in the described array.

Although only one embodiment of the invention has been illustrated and described, it will undoubtedly by apparent to those skilled in the art that various modifications thereof, as well as other embodiments, all coming within the spirit of the present invention, are possible. For example, instead of arranging the two groups of partitions in orthogonal, or right angle, relation to each other, they can cross each other at some other angular relationship to form cells which are diamond shaped in cross section, rather than of square cross section, as shown. If desired, the lower closure plate 111 can be made of a sheet of thin, soft rubber to insure a good seal at the lower end of the labyrinth, by reason of pressure applied thereto by the plate 65 when the structure is assembled. Other variations in the labyrinth structure, as well as in the labyrinth connector, all coming within the spirit of this invention will, no doubt, also suggest themselves. It is desired, therefore, that the foregoing shall be taken in an illustrative sense and not in a limiting one.

What is claimed is:

1. In a microphone of the type having a vibratory conductor in a magnetic field,
a labyrinth structure for loading said conductor comprising first and second groups of partitions disposed in angular relation to each other and interlocked to provide a plurality of cells,
a said cells being successively in communication with each other at opposite ends beginning with a first one thereof and ending with a last one thereof to thereby provide a continuous passage through all of said cells.

2. In a microphone of the type having a vibratory conductor in a magnetic field,
a labyrinth structure for loading said conductor comprising a first group of parallel partitions and a second group of parallel partitions,
the partitions of said second group being disposed in crossed relation with those of said first group and interlocked therewith to provide a plurality of individual cells,
said cells being successively in communication with each other at opposite ends thereof beginning with a first one thereof and ending with a last one thereof to thereby provide a continuous passage through all of said cells.

3. In a microphone of the type having a vibratory conductor in a magnetic field,
a labyrinth structure for loading said conductor comprising a first group of spaced, parallel partitions and a second group of spaced, parallel partitions disposed in orthogonal relation to said fisrt group of partitions and interlocked therewith to provide a plurality of individual cells,
said partitions all being of the same over-all height but being undercut at selected locations along their respective longitudinal edges at such locations as to provide continuous, serial communication between said cells beginning with a first one thereof and ending with a last one thereof whereby to establish a long, continuous passage through all of said cells from said first one on through said last one.

4. In a microphone of the type having a vibratory conductor in a magnetic field,
a labyrinth structure for loading said conductor comprising an array of a first group of spaced, parallel partitions and a second group of spaced, parallel partitions disposed in orthogonal relation to those of said first group of partitions and interlocked therewith to provide a plurality of individual cells,
said partitions being of the same over-all height but being undercut at selected locations along their respective, opposed, longitudinal edges,
the undercuts being at such locations along the respective said edges that certain adjacent pairs of said cells communicate with each other at one end of said array and certain other pairs of said cells communicate with each other at the opposite end of said array in a manner to provide continuous serial communication between all of said cells beginning with a first one of said cells and ending with a last one thereof to thereby provide a long, continuous passage through all of said cells from said first one on through said last one.

5. In a microphone of the type having a vibratory conductor in a magnetic field, a labyrinth structure for loading said conductor comprising an array of
(1) a first group of spaced, parallel partitions, each of said partitions having transverse slots therein extending part way thereacross from one of its longitudinal edges toward the other at selected, spaced locations along said one longitudinal edge, and
(2) a second group of spaced, parallel partitions, each of said second group partitions also having transverse slots therein extending part way thereacross from one of its longitudinal edges toward the other at correspondingly spaced locations along said one longitudinal edge but in a direction opposite to that of said first mentioned slots,
(3) said partition of said second group being disposed in orthogonal relation to those of said first group and being interlocked therewith at said slots to provide a plurality of individual cells, said partitions all having the same over-all height when so interlocked, and
(4) said partitions of the respective said groups being undercut along their respective, opposed, longitudinal edges at selected locations such that certain pairs of adjacent ones of said cells communicate with each other at one end of said array and certain other pairs of adjacent ones of said cells communicate with each other at the opposite end of said array and in a manner to provide continuous serial communication between said cells beginning with a first one of said cells and ending with a last one thereof to thereby provide a long, continuous passage through all of said cells from said first one on through said last one.

6. The invention set forth in claim 5 wherein succeeding pairs of said cells have one cell in common, said common cell having communication with the cell that precedes it at one end of said array and with the cell that follows it at the other end of said array in a direction going from said first cell to said last cell.

7. The invention set forth in claim 5 characterized by the addition of a labyrinth connector which couples said conductor to said labyrinth structure.

8. The invention set forth in claim 6 characterized by the addition of acoustic resistance material in each of said cells.

9. The invention set forth in claim 5 characterized by the addition of closure plates at each end of said labyrinth structure, said plates closing the ends of said cells, one of said closure plates having an opening over one of said cells to provide access of sound wave energy thereinto, characterized further by the addition of a hollow labyrinth connector coupling said conductor to said labyrinth structure at said one cell, and characterized still further by the addition of acoustic resistance material in all of said cells for dissipating said energy.

10. The invention set forth in claim 5 wherein said array includes end cells at the ends of said partitions which are open along the sides thereof, and characterized by the addition of a shell around said array which closes said open sides to provide additional cells for said labyrinth structure, certain of said partitions being undercut at selected locations to provide communication between certain of said individual cells and said additional cells so as to include said additional cells in said continuous passage.

No references cited.

KATHLEEN H. CLAFFY, *Primary Examiner.*

A. A. McGILL, *Assistant Examiner.*